Sept. 7, 1937.  J. E. HORNER  2,092,254
ROTARY COMBUSTION ENGINE
Filed April 1, 1936  4 Sheets-Sheet 1

Inventor
Jack E. Horner
By L. F. Randolph Jr.
Attorney

Sept. 7, 1937.　　　　J. E. HORNER　　　　2,092,254
ROTARY COMBUSTION ENGINE
Filed April 1, 1936.　　　4 Sheets-Sheet 2

Inventor
Jack E. Horner
By L. F. Landruth Jr.
Attorney

Sept. 7, 1937.         J. E. HORNER         2,092,254
ROTARY COMBUSTION ENGINE
Filed April 1, 1936         4 Sheets-Sheet 3

Inventor
Jack E. Horner
By L. F. Landruth Jr.
Attorney

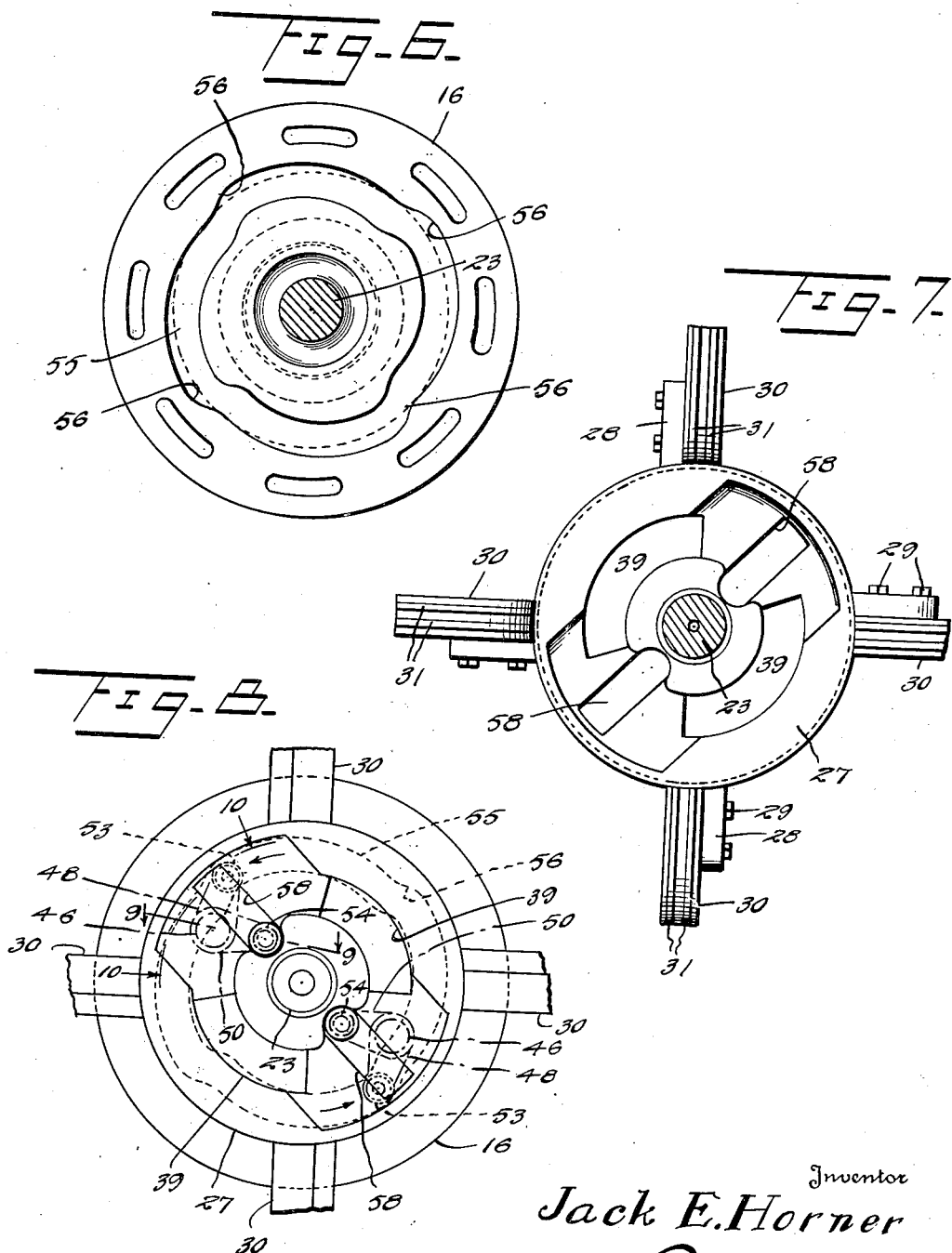

Patented Sept. 7, 1937

2,092,254

UNITED STATES PATENT OFFICE 2,092,254

ROTARY COMBUSTION ENGINE

Jack E. Horner, Jacksonville, Fla.

Application April 1, 1936, Serial No. 72,204

3 Claims. (Cl. 123—11)

This invention relates to an internal combustion engine of the rotary type.

It is generally aimed to provide a novel construction embodying relatively simple and durable parts designed to afford maximum efficiency and power in a rotary engine of minimum size, or in proportion to its size and fuel consumption.

It is further aimed to provide a novel structure wherein the pistons are carried by rotatable elements and which pistons have movement relatively to each other during the cycles of operation.

The more specific objects and advantages will become apparent from a consideration of the description following taken in connection with accompanying drawings illustrating an operative embodiment.

In said drawings:—

Figure 4 is an enlarged detail section primarily showing the driving system means;

Figure 5 is a detailed side elevation of the driving system means;

Figure 6 is a detail view showing the interior of one of the casing heads;

Figure 7 is a detail side elevation of the compression system means;

Figure 8 is a view fragmentarily showing in elevation, a compression system means in combination with operating crank means therefor;

Figure 9 is a detail section taken substantially on the line 9—9 of Figure 8;

Figure 10 is a detail section taken substantially on the line 10—10 of Figure 8;

Figure 11 is a fragmentary elevation of a portion of the casing looking interiorly thereof to show the intake and exhaust ports;

Figure 1:
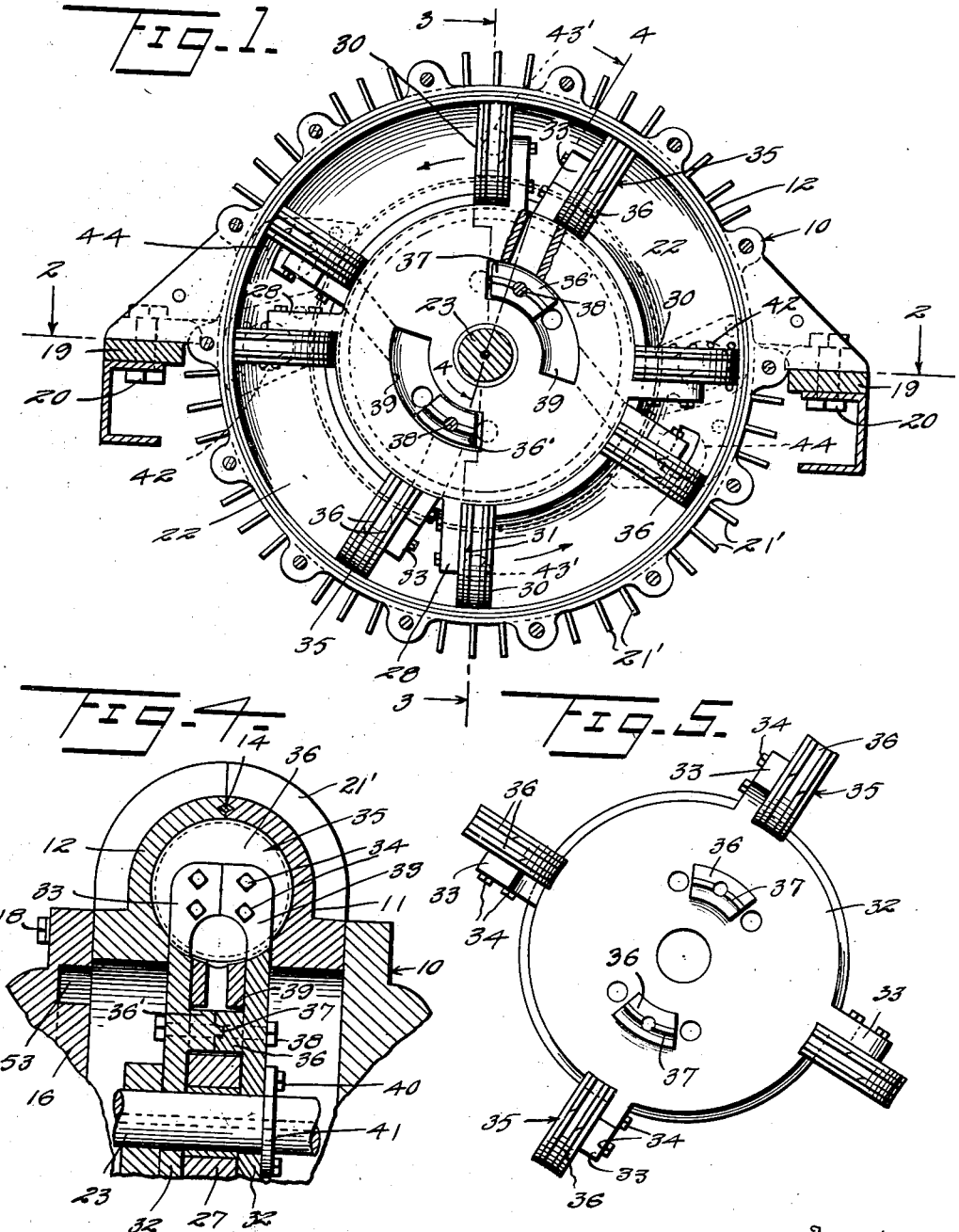
Figure 1 is a view in substantially central vertical section transversely of the drive shaft, illustrating the improved engine.
Figure 2:
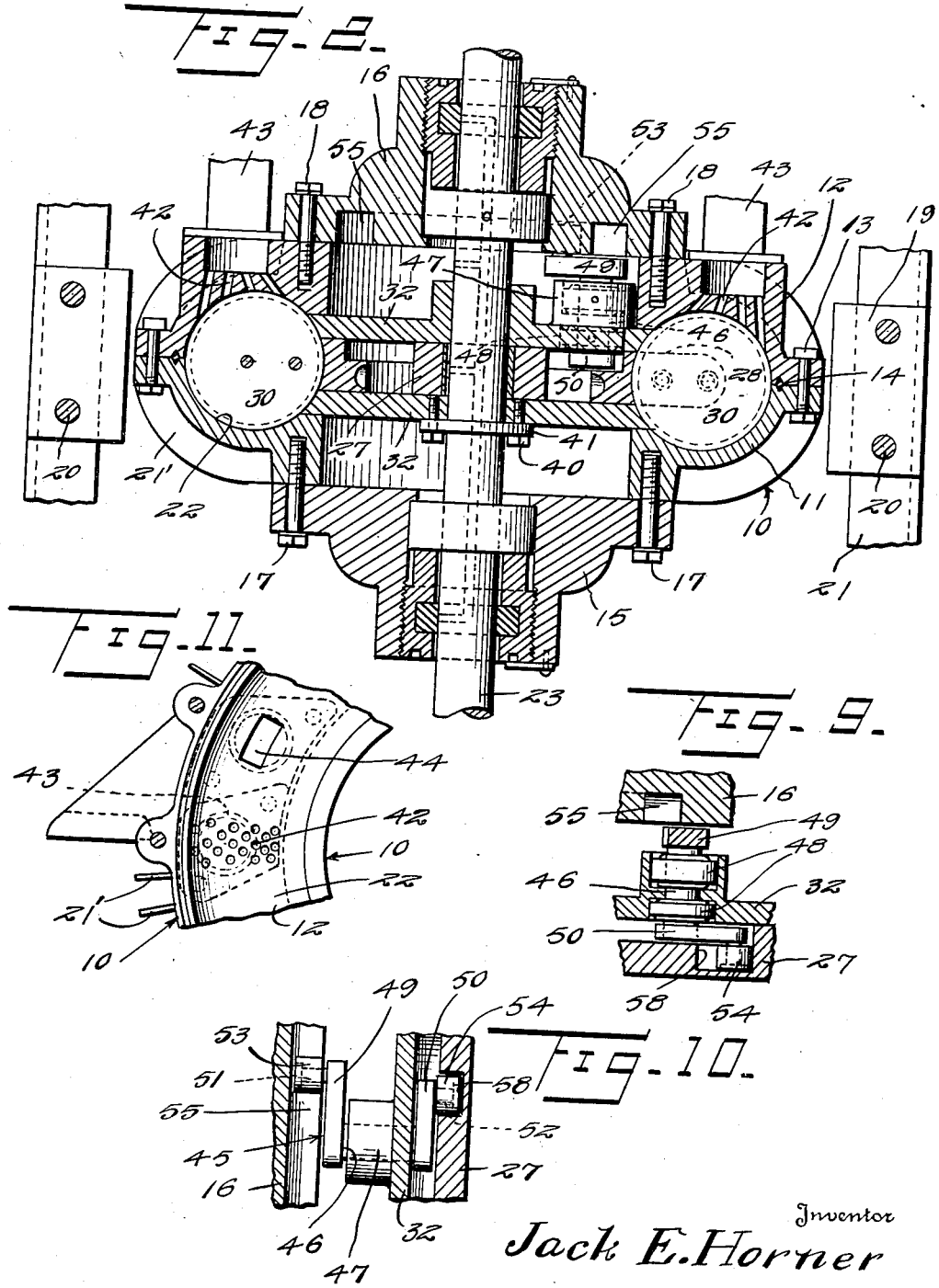
Figure 2 is a horizontal sectional view taken substantially on the plane of line 2—2 of Figure 1.
Figure 3:
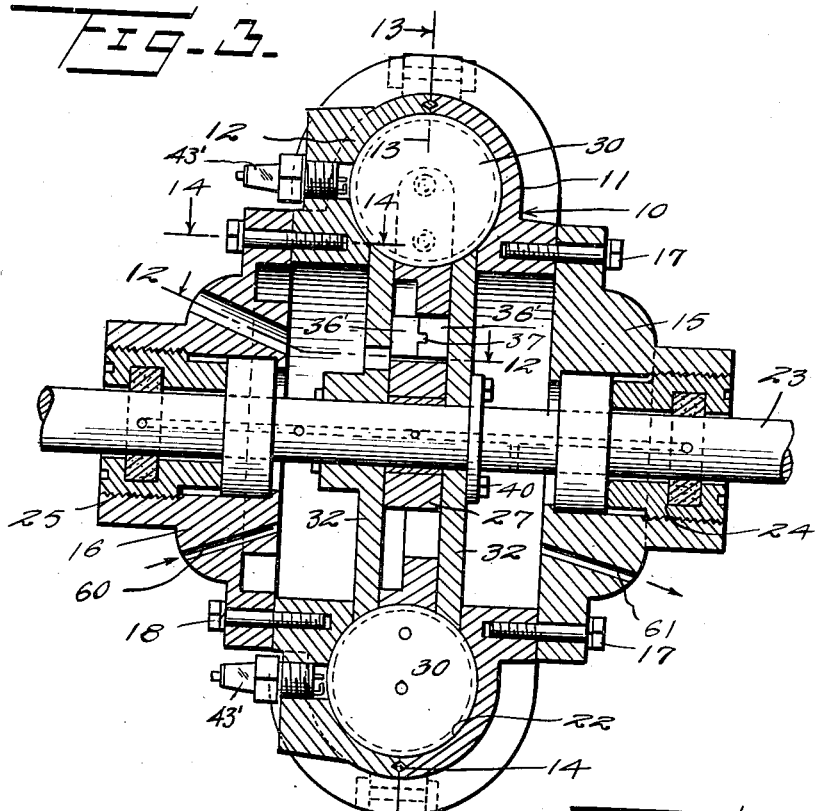
Figure 3 is a vertical sectional view taken substantially on the plane of line 3—3 of Figure 1.
Figure 13:
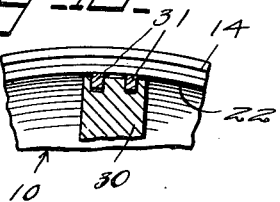
Figure 13 is a detail section taken on the line 13—13 of Figure 3.
Figure 12:
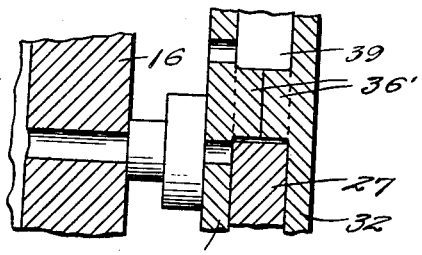
Figure 12 is a detail section taken on the line 12—12 of Figure 3.
Figure 14:
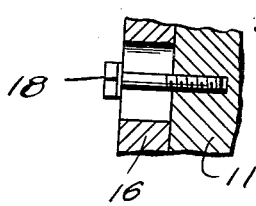
Figure 14 is a detail section taken on the line 14—14 of Figure 3.

Referring specifically to the drawings wherein like reference characters designate like or similar parts, the engine has a suitable stator or stationary casing generally designated 10 and consisting for example of round main sections 11 and 12, detachably bolted together as at 13 with suitable gasket means interposed as at 14. Such stator or casing also includes heads at the sides thereof as at 15 and 16, bolted as at 17 and 18, detachably to the sections 11 and 12, respectively. Rigid or integral with one of the sections 11 or 12 are brackets 19 adapted to be bolted as at 20 to a suitable support 21. The stator or casing 10 may be provided with any suitable cooling means or system and for instance be air-cooled in view of the provision of fins as at 21'.

Interiorly of the casing, close to the periphery thereof, is an annular chamber 22, which is also round in radial cross-section.

The main shaft of the engine is shown at 23 journaled in any suitable manner by means of bearings 24 and 25 in the head 16 and 15 respectively, which shaft it will be understood, as well as the other working parts of the engine are lubricated in any suitable manner, not constituting a part of the present invention.

Loosely journaled on the shaft 23 is a plate or disc 27 having four or any desired number of arms 28 extending outwardly therefrom and to which are bolted or otherwise secured as at 29, radially disposed pistons 30 which operate in the chamber or passage 22 and which pistons are of the same shape radially of the engine, that is round. Such pistons are also preferably provided with rings or other packing as at 31 to obtain maximum compression.

Disposed on opposite sides of the plate or disc 27 are plates or discs 32 which have arms 33 extending therefrom and fastened by bolts or the like at 34 to driving pistons 35 which are shaped similarly to the pistons 30, and have rings or other packing as at 36. The pistons 35 alternate with the pistons 30. Said discs or plates 32 are rigidly connected together as they have blocks at 36, preferably interfitted at 37, and through which plates 32 and blocks, bolts 38 preferably pass. The blocks 36 are segmental and fit segmental openings 39 provided through plates or discs 27 and which openings 39 are longer than the blocks 36, so that relative movement between the pistons and said plates or discs may occur as is necessary for the intake, compression, firing and exhausting strokes of the pistons, as will be later explained more in detail.

The plates 32 are rigidly connected to the shaft 23, by means of bolts or the like 40 passing through a flange or collar 41 rigid on said shaft and entering one of the plates 32 as best shown in Figure 4.

Any suitable fuel pump or carbureting means